United States Patent
Sabtu et al.

(10) Patent No.: US 9,295,243 B2
(45) Date of Patent: Mar. 29, 2016

(54) RATCHET WHEEL FOR FISHING REEL

(71) Applicant: Shimano Components (Malaysia) SDN. BHD., Pontian, Johor (MY)

(72) Inventors: Baihaki Bin Sabtu, Johor (MY); Abu Supian Bin Ahmad, Johor (MY); Md Shahid Bin Sowarni, Johor (MY); Chun Wee Chew, Johor (MY)

(73) Assignee: Shimano Components (Malaysia) SDN. BHD., Johor (MY)

( * ) Notice: Subject to any disclaimer, the term of this patent is extended or adjusted under 35 U.S.C. 154(b) by 44 days.

(21) Appl. No.: 14/196,085

(22) Filed: Mar. 4, 2014

(65) Prior Publication Data

US 2014/0263791 A1 Sep. 18, 2014

(30) Foreign Application Priority Data

Mar. 15, 2013 (JP) .................................. 2013-053357

(51) Int. Cl.
*A01K 89/01* (2006.01)
*A01K 89/0155* (2006.01)
*A01K 89/015* (2006.01)

(52) U.S. Cl.
CPC .............. *A01K 89/0155* (2013.01); *A01K 89/01* (2013.01); *A01K 89/015* (2013.01); *Y10T 74/19679* (2015.01)

(58) Field of Classification Search
CPC ........... A01K 89/0117; A01K 89/0118; A01K 89/0123; A01K 89/0124; A01K 89/0125; A01K 89/0178; A01K 89/018; A01K 89/0181; A01K 89/051; A01K 89/033; A01K 89/015
See application file for complete search history.

(56) References Cited

U.S. PATENT DOCUMENTS

| | | | | | |
|---|---|---|---|---|---|
| 2,528,926 | A | * | 11/1950 | Von Pein | 242/292 |
| 3,138,343 | A | * | 6/1964 | Henze | 242/308 |
| 3,171,609 | A | * | 3/1965 | Baenziger | 242/260 |
| 5,485,969 | A | * | 1/1996 | Yamaguchi | 242/247 |
| 6,189,822 | B1 | * | 2/2001 | Ikuta | 242/296 |
| 2002/0033426 | A1 | * | 3/2002 | Kitajima et al. | 242/261 |
| 2006/0138267 | A1 | * | 6/2006 | Ikuta et al. | 242/245 |
| 2006/0169814 | A1 | * | 8/2006 | Ikuta et al. | 242/295 |
| 2009/0277984 | A1 | * | 11/2009 | Wee et al. | 242/257 |
| 2010/0006690 | A1 | * | 1/2010 | Takechi | 242/396.5 |
| 2011/0180647 | A1 | * | 7/2011 | Niitsuma et al. | 242/307 |

FOREIGN PATENT DOCUMENTS

JP 2006-87301 A 4/2006

* cited by examiner

*Primary Examiner* — Emmanuel M Marcelo
(74) *Attorney, Agent, or Firm* — Global IP Counselors (57) ABSTRACT

A ratchet wheel is provided for a fishing reel (e.g., a spinning reel or a dual-bearing reel). The ratchet wheel is mounted onto a first component of the fishing reel. The ratchet wheel being engagable with a claw member pivotally mounted to a second component of the fishing reel. The second component is configured to be rotatable relatively to the first component. The ratchet wheel has a mounting part and a plurality of teeth. The mounting part is configured to be mounted onto the first component. The teeth are radially disposed on one of an outer peripheral portion of the mounting part and an inner peripheral portion of the mounting part. The teeth extend from the one of the outer and inner peripheral portions. The teeth are configured such that two adjacent ones of the teeth selectively engage the claw member.

13 Claims, 9 Drawing Sheets

RATCHET WHEEL FOR FISHING REEL

CROSS-REFERENCE TO RELATED APPLICATIONS

This application claims priority to Japanese Patent Application No. 2013-053357 filed on Mar. 15, 2013, the entirety of which is hereby incorporated herein by reference in its entirety.

BACKGROUND OF THE INVENTION

1. Field of the Invention

The present invention generally relates to a ratchet wheel. More particularly, the present invention relates to a ratchet wheel for a fishing reel, which is attached to a first component for the fishing reel, and is engaged with a claw member, which is pivotally mounted to a second component that is configured to be rotatable relatively to the first component.

2. Background Art

In a dual-bearing reel as one type of fishing reels, ratchet wheels are used for an anti-reverse mechanism configured to prevent reverse rotation of a spool and a spool sound producing mechanism configured to produce a sound in conjunction with rotation of the spool. On the other hand, in a spinning reel as another type of fishing reels, a ratchet wheel is used for a sound producing mechanism configured to produce a sound in conjunction with rotation of a spool. Such a well-known ratchet wheel is a plate-shaped member, and has a plurality of teeth that are disposed on the outer peripheral surface of the ratchet wheel while being circumferentially aligned at intervals (see e.g., Japanese Laid-Open Patent Application Publication No. JP-A-2006-087301).

The conventional ratchet wheel is formed by a plate-shaped member, and therefore, the axial thickness thereof is small. Where such a ratchet wheel has a small thickness, there are chances of producing a trouble that a sound producing mechanism cannot normally produce a sound when the ratchet wheel and a claw member are axially displaced from each other. On the other hand, there are chances of producing a trouble that the claw member is disengaged from the ratchet wheel in the anti-reverse mechanism and this makes it impossible to prevent reverse rotation of the spool. Therefore, the well-known claw member is axially elongated to cope with such troubles. For example, to axially elongate the claw member, the claw member is increased in its thickness, or alternatively, is formed in a shape bent along the axial direction. However, when the claw member is bent along the axial direction, the strength of the claw member is degraded. Therefore, such claw member can be used for the spool sound producing mechanism but cannot be used for the anti-reverse mechanism.

It is an object of the present invention to inhibit occurrence of a trouble in a ratchet wheel without elongating the axial length of a claw member even when the ratchet wheel and the claw member are displaced from each other.

SUMMARY

A ratchet wheel for a fishing reel according to the present invention is mounted to a first component for the fishing reel. The ratchet wheel is engaged with a claw portion of a claw member pivotally mounted to a second component configured to be rotatable relatively to the first component. The ratchet wheel for a fishing reel includes a mounting part and a plurality of teeth. The mounting part is mountable to the first component. The teeth are radially disposed on either an outer peripheral portion or an inner peripheral portion of the mounting part. The teeth are bent from either the outer peripheral portion or the inner peripheral portion, and extend along a rotary axis of either the first component or the second component. The teeth allow the claw portion of the claw member to be engaged with any adjacent two thereof.

In the ratchet wheel for a fishing reel, the claw portion of the claw member is engaged with any adjacent two of the teeth. The teeth extend along the rotary axis. Therefore, even when the ratchet wheel and the claw member are displaced from each other in the rotary axial direction, the claw portion of the claw member is allowed to be engaged with the teeth. Here, the teeth of the ratchet wheel are formed so as to extend from the mounting part along the direction of the rotary axis. Therefore, the length of the teeth along the axial direction becomes larger than the thickness of the mounting part. Accordingly, troubles become unlikely to be caused without elongating the axial length of the claw member even when the ratchet wheel and the claw member are displaced from each other.

The mounting part and the teeth can be integrally formed by a plate-shaped member and the teeth can be bent by press work. In this case, the ratchet wheel can be easily formed, for example, by producing a circular part to be obtained as the mounting part and radial portions to be obtained as the teeth disposed on the outer (or inner) peripheral portion of the circular part to be obtained as the mounting part by punch work, and then, by bending the radial portions to be obtained as the teeth by press work.

The teeth can be bent from the outer peripheral portion of the mounting part. In this case, the teeth are formed on the outer peripheral portion of the mounting part. Therefore, the portions to be obtained as the teeth extend such that the gaps therebetween gradually extend radially outward. Therefore, no limitation is imposed on the length of the teeth along the axial direction. Thus, the mounting part and the teeth can be easily formed by punching.

The teeth can be bent from the inner peripheral portion of the mounting part. In this case, a limitation is imposed on the length of the teeth along the axial direction when the portions to be obtained as the teeth are formed by punching. However, the ratchet wheel can be formed with a large diameter.

The first component can be a spool shaft for a spinning reel of the fishing reel, and the second component can be a spool rotatably mounted onto the spool shaft. Further, the mounting part can be non-rotatably mounted onto the spool shaft and can be used for a spool sound producing mechanism configured to produce a sound in conjunction with rotation of the spool. In this case, troubles become unlikely to be caused in the spool sound producing mechanism of the spinning reel, even when back-and-front adjustment is performed for the spool.

The first component can be a rotary member configured to be rotated in conjunction with rotation of a handle for a dual-bearing reel of the fishing reel, and the second component can be a reel unit for the dual-bearing reel. Further, the mounting part can be mounted to the rotary member in a unitarily rotatable state, and can be used for an anti-reverse mechanism configured to prevent the rotary member from rotating in one direction. In this case, troubles become unlikely to be caused in the anti-reverse mechanism of a dual-bearing reel, even when the thickness of the claw member is increased in accordance with drag force.

Advantageous Effects of Invention

According to the present invention, the teeth of the ratchet wheel are formed so as to extend from the mounting part along the axial direction of the rotary axis. Therefore, the length of the teeth along the axial direction becomes larger than the thickness of the mounting part. Accordingly, troubles become unlikely to be caused without elongating the axial length of the claw member even when the ratchet wheel and the claw member are displaced from each other.

BRIEF DESCRIPTION OF THE DRAWINGS

Referring now to the attached drawings which form a part of this original disclosure.

DETAILED DESCRIPTION OF THE EMBODIMENTS

First Exemplary Embodiment

Entire Structure

Figure 1:
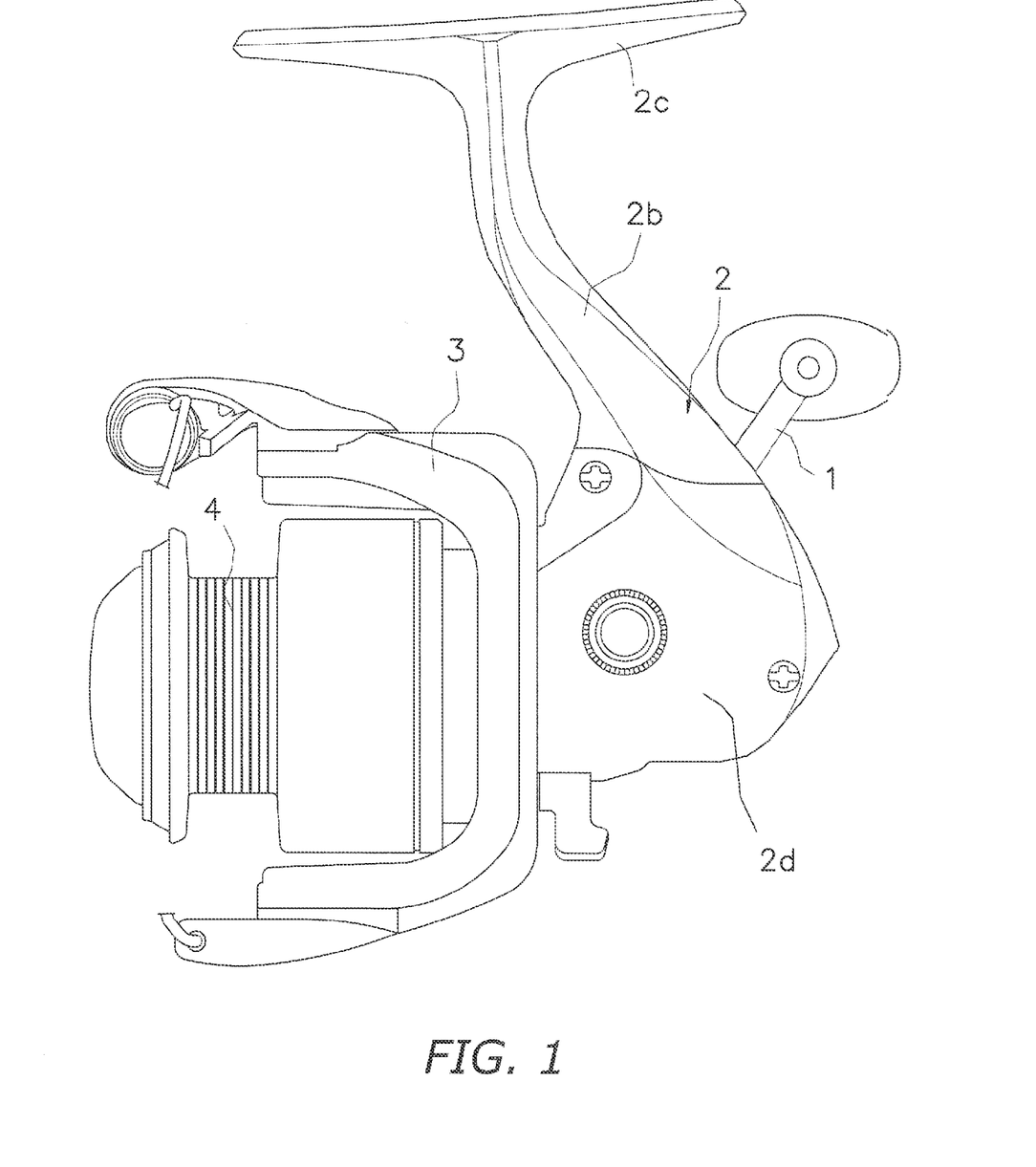
FIG. 1 is a side elevational view of a spinning reel employing a ratchet wheel in accordance with a first exemplary embodiment.

In FIG. 1, a spinning reel employing a first exemplary embodiment of the present invention is of a front drag type configured to wind a fishing line about an axis X1 arranged along the longitudinal direction of a fishing rod. The spinning reel includes a reel unit 2, a rotor 3 and a spool 4. The reel unit 2 includes a handle 1. The rotor 3 is supported at the front of the reel unit 2, while being rotatable about the axis X1. The spool 4 is disposed at the front of the rotor 3, and is configured to wind the fishing line thereon.

Reel Unit

Figure 2:
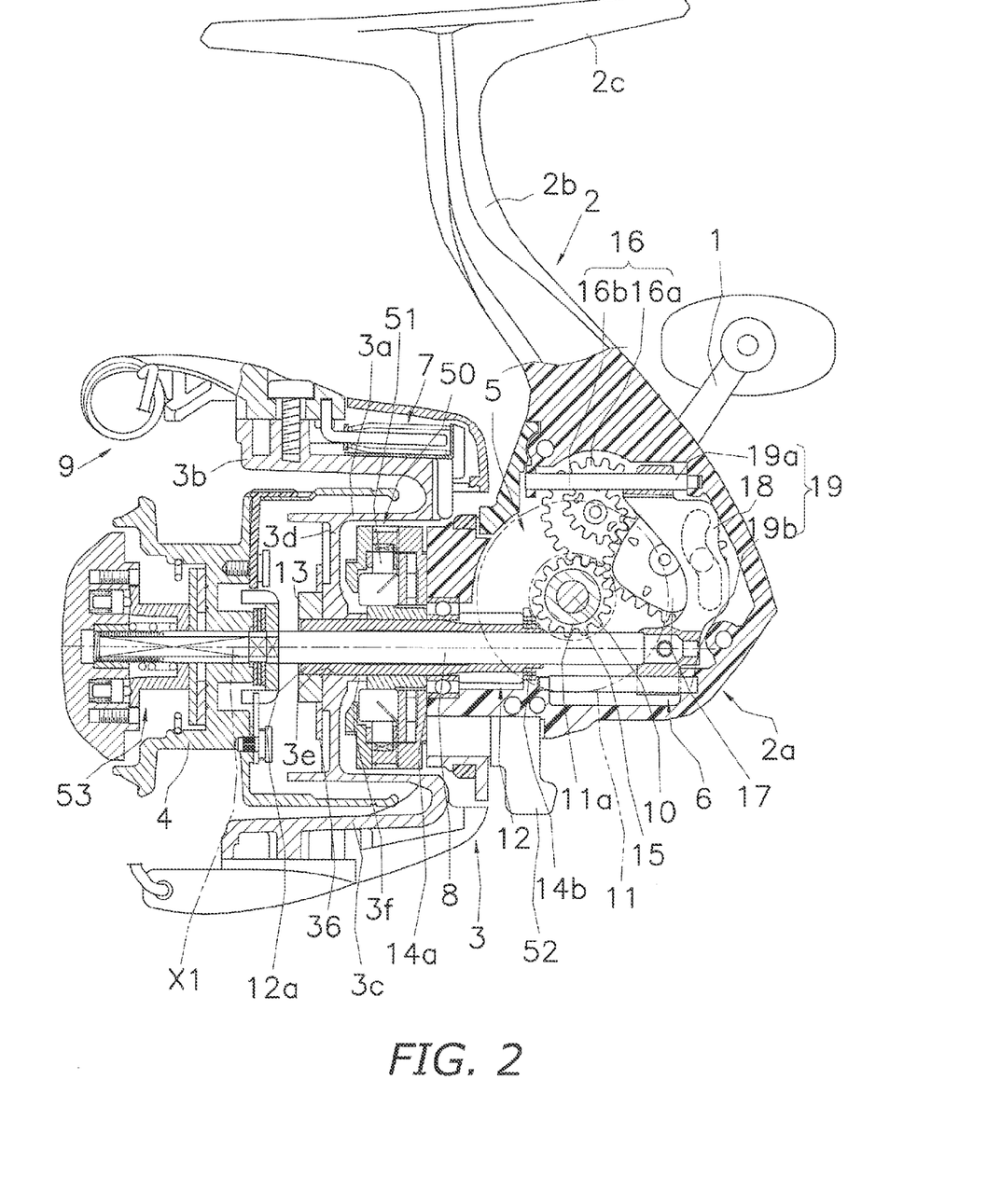
FIG. 2 is a cross-sectional view of the spinning reel illustrated in FIG. 1.

The reel unit 2 is made of, for example, metal or synthetic resin. As illustrated in FIGS. 1 and 2, the reel unit 2 has an attachment portion 2c, a reel body 2a (see FIG. 2) and a leg portion 2b. The attachment portion 2c is elongated in a back-and-front direction of the spinning reel. The attachment portion 2c is attached to the fishing rod. The reel body 2a is disposed away from the attachment portion 2c at a predetermined distance. The leg portion 2b couples the attachment portion 2c and the reel body 2a. The reel body 2a includes a mechanism attachment space in the interior thereof, and is laterally opened. The opened part of the reel body 2a is covered with a lid member 2d.

A rotor drive mechanism 5 and an oscillating mechanism 6 are disposed in the interior of the reel body 2a. The rotor drive mechanism 5 is configured to rotate the rotor 3. The oscillating mechanism 6 is configured to reciprocate the spool 4 back and forth in conjunction with rotation of the handle 1 in the back-and-front direction of the spinning reel.

Rotor

The rotor 3 is made of, for example, synthetic resin or metal, and is rotatably supported by the reel unit 2. The rotor 3 has a cylindrical portion 3a, a first arm portion 3b and a second arm portion 3c. The first and second arm portions 3b and 3c are disposed laterally to the cylindrical portion 3a, while being opposed to each other. Further, the cylindrical portion 3a has a boss portion 3f in the center part of a front wall 3d thereof. The boss portion 3f has a through hole 3e. A spool shaft 8 and a pinion gear 12 (to be described) extend through the through hole 3e. A bail arm 8 is mounted to the tip ends of the first arm portion 3b and the second arm portion 3c. The bail arm 8 is pivotally arranged between a fishing-line winding position and a fishing-line releasing position. The fishing line is guided onto the spool 4 by the bail arm 9.

The bail arm 9 is configured to be returned to the fishing-line winding position from the fishing-line releasing position by a bail flipping mechanism 7 that is mounted to the first arm portion 3b in conjunction with rotation of the rotor 3 in the fishing-line winding direction. The rotor 3 is prevented from being rotated in the fishing-line winding direction by an anti-reverse mechanism 50. The anti-reverse mechanism 50 includes a one-way clutch 51 and a switch lever 52. The one-way clutch 51 is of a roller type and can be switched between a reverse rotation prevented state and a reverse rotation allowed state. The switch lever 52 is configured to switch the one-way clutch 51 between the reverse rotation prevented state and the reverse rotation allowed state.

Rotor Drive Mechanism

The rotor drive mechanism 5 includes a drive gear 11 and the pinion gear 12. The drive gear 11 has a drive gear shaft 11a that is configured to be rotated together with a drive shaft 10 onto which the handle 1 is fixed. The pinion gear 12 is meshed with the drive gear 11. The drive gear shaft 11a is rotatably supported by the reel unit 2. The pinion gear 12 is a tubular member that the spool shaft 8 extends through the center thereof. The front portion of the pinion gear 12 extends toward the spool 4, while extending through the through hole 3e of the rotor 3. The rotor 3 is non-rotatably fixed to the pinion gear 12 at the front portion 12a by a nut 13. The pinion gear 12 is rotatably supported by the reel unit 2 through a pair of bearings 14a and 14b. Specifically, the intermediate portion of the pinion gear 12 is supported by the bearing 14a, while the rear portion of the pinion gear 12 is supported by the bearing 14b. The nut 13 is prevented from being loosened by a retainer 36. The retainer 36 is fixed by screws screwed into screw holes bored in the front wall 3d.

Spool and Spool Shaft

Figure 3:
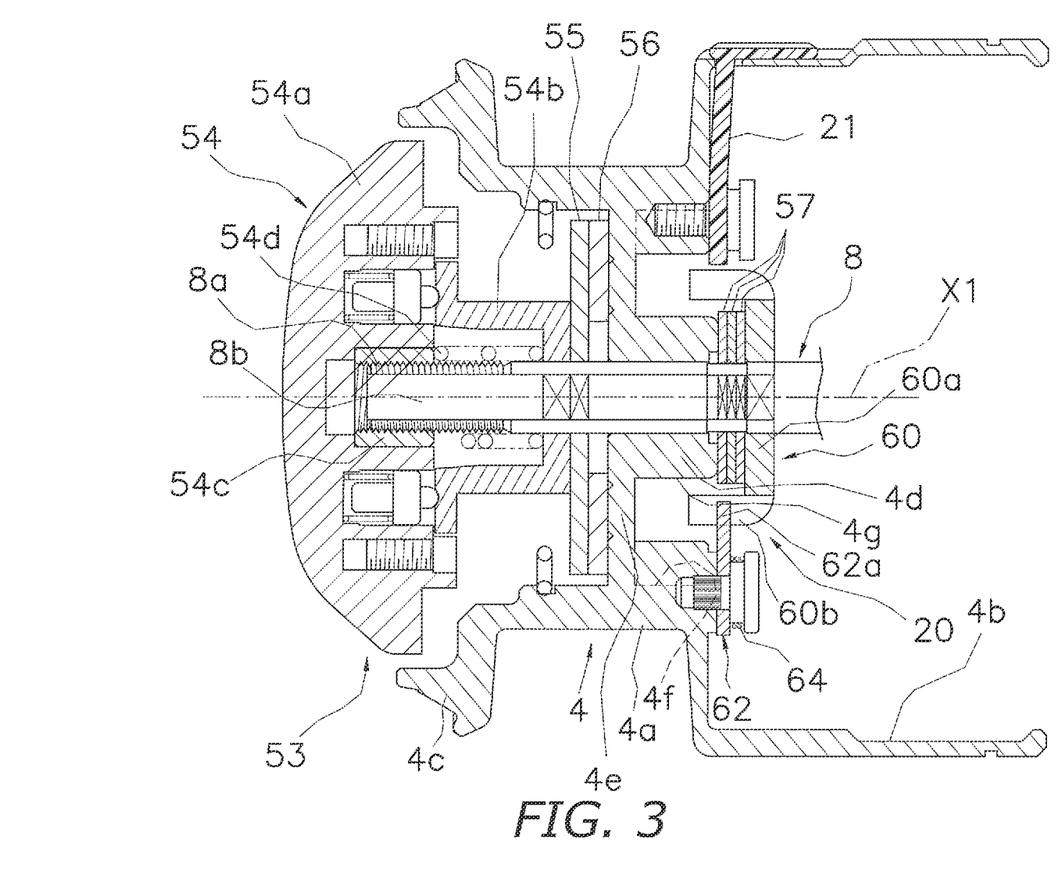
FIG. 3 is a cross-sectional view of a spool and the related part thereof in the spinning reel illustrated in FIGS. 1 and 2.
Figure 4:
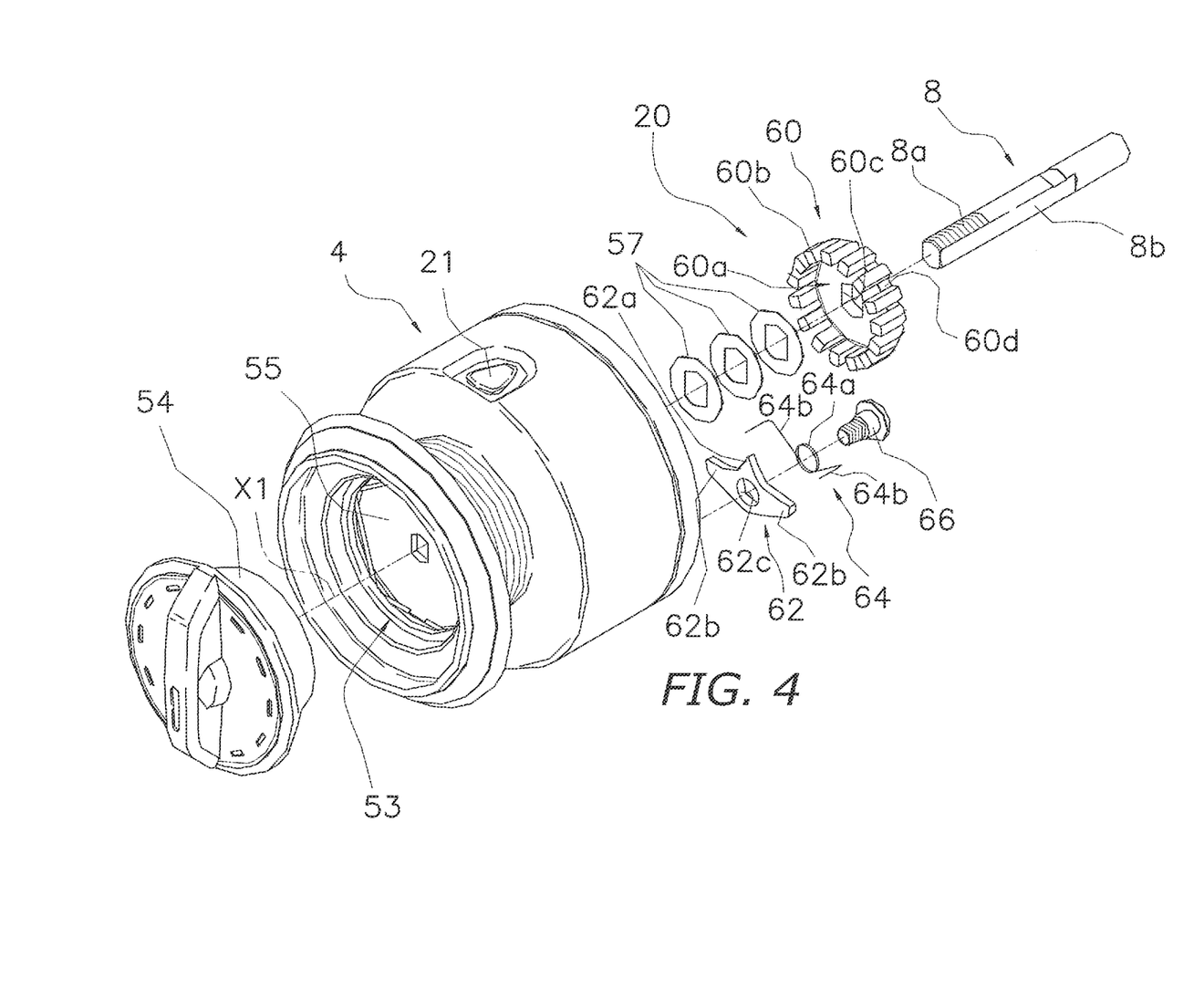
FIG. 4 is an exploded perspective view of the spool and the vicinity thereof.

As illustrated in FIG. 2, the spool 4 is a member made of, for example, metal or synthetic resin, and is disposed between the first and second arm portions 3b and 3c of the rotor 3. The spool 4 is rotatably mounted to the tip end of the spool shaft 8 disposed along the axis X1 in the back-and-front direction through a drag mechanism 53. As illustrated in FIGS. 3 and 4, the spool 4 has a bobbin trunk 4a, a skirt 4b and a front flange 4c. The bobbin trunk 4a is a tubular portion that the fishing line is wound onto the outer peripheral surface thereof. The skirt 4b is a large-diameter tubular portion integrally formed on the rear end of the bobbin trunk 4a. The front flange 4c is a large-diameter portion integrally formed on the front end of the bobbin trunk 4a. As illustrated in FIG. 3, the spool 4 further has a boss portion 4d and a disc portion 4e. The boss portion 4d is formed in the inner peripheral part of the spool 4 and is rotatably mounted onto the spool shaft 8. The disc portion 4e couples the boss portion 4d and the bobbin trunk 4a. Further, a tubular space is produced on the rear side of the bobbin trunk 4a. The tubular space is defined by an inner peripheral surface 4f of the bobbin trunk 4a, an outer peripheral surface 4g of the boss portion 4d and the disc portion 4e. Yet further, a spool sound producing mechanism 20 and a fishing-line hook 21 are disposed on the rear surface of the bobbin trunk 4a, while being separated at an angular interval of 180 degrees. The spool sound producing mechanism 20 is configured to produce a sound in conjunction with rotation of the spool 4. The fishing-line hook 21 functions as a hook on which the fishing line is hooked.

As illustrated in FIGS. 3 and 4, the spool shaft 8 is disposed along the back-and-front direction. The spool shaft 8 has a male threaded portion 8a and a pair of anti-rotation portions 8b. The male threaded portion 8a is formed on the tip end of the spool shaft 8. The anti-rotation portions 8b are portions chamfered in parallel to each other. A slider part 18 (to be described) of the oscillating mechanism 6 is fixed to the rear end of the spool shaft 8. The axial length of the anti-rotation portions 8b is larger than that of the male threaded portion 8a.

Drag Mechanism

As illustrated in FIG. 3, the drag mechanism 53 includes a drag knob 54, a drag plate 55 and a drag washer 56. The drag knob 54 is a member for regulating drag force. The drag plate 55 is configured to be pressed by the drag knob 54. The drag washer 56 is disposed between the drag plate 55 and the disc portion 4e of the spool 4. The drag knob 54 includes a knob body 54a and a pressing member 54b. The pressing member 54b is non-rotatably engaged with the spool shaft 8. The knob body 54a includes a nut member 54c in the inner peripheral part thereof. The nut member 54c is screwed onto the male threaded portion 8a of the spool shaft 8. The pressing member 54b is engaged with the anti-rotation portions 8b of the spool shaft 8. The pressing member 54b is thus supported by the spool shaft 8 while being non-rotatable and axially movable. Further, a coil spring 54d is disposed between the pressing member 54b and the nut member 54c, while being compressed therebetween. The drag plate 55 is non-rotatably engaged with the anti-rotation portions 8b. Further, the rear end surface of the boss portion 4d of the spool 4 has a plurality of (e.g., three) adjuster washers 57 disposed thereon. The adjuster washers 57 serve to adjust the axial position of the spool 4. The adjuster washers 57 are engaged with the anti-rotation portions 8b. A ratchet wheel 60 is disposed on the rear ends of the anti-rotation portions 8b. The ratchet wheel 60 is a ratchet wheel according to the first exemplary embodiment of the present invention, and forms a part of the spool sound producing mechanism 20. Backward moving of the ratchet wheel 60 is restricted because of the structure that the ratchet wheel 60 is engaged with the rear ends of the anti-rotation portions 8b. While forming a part of the spool sound producing mechanism 20 as described above, the ratchet wheel 60 also has a function of restricting backward moving of the spool 4 and actuating the drag mechanism 53. It should be noted that in FIG. 3, intersecting fine lines, depicted on the anti-rotation portions 8b, indicate sections with which components are engaged.

Spool Sound Producing Mechanism

Figure 5:
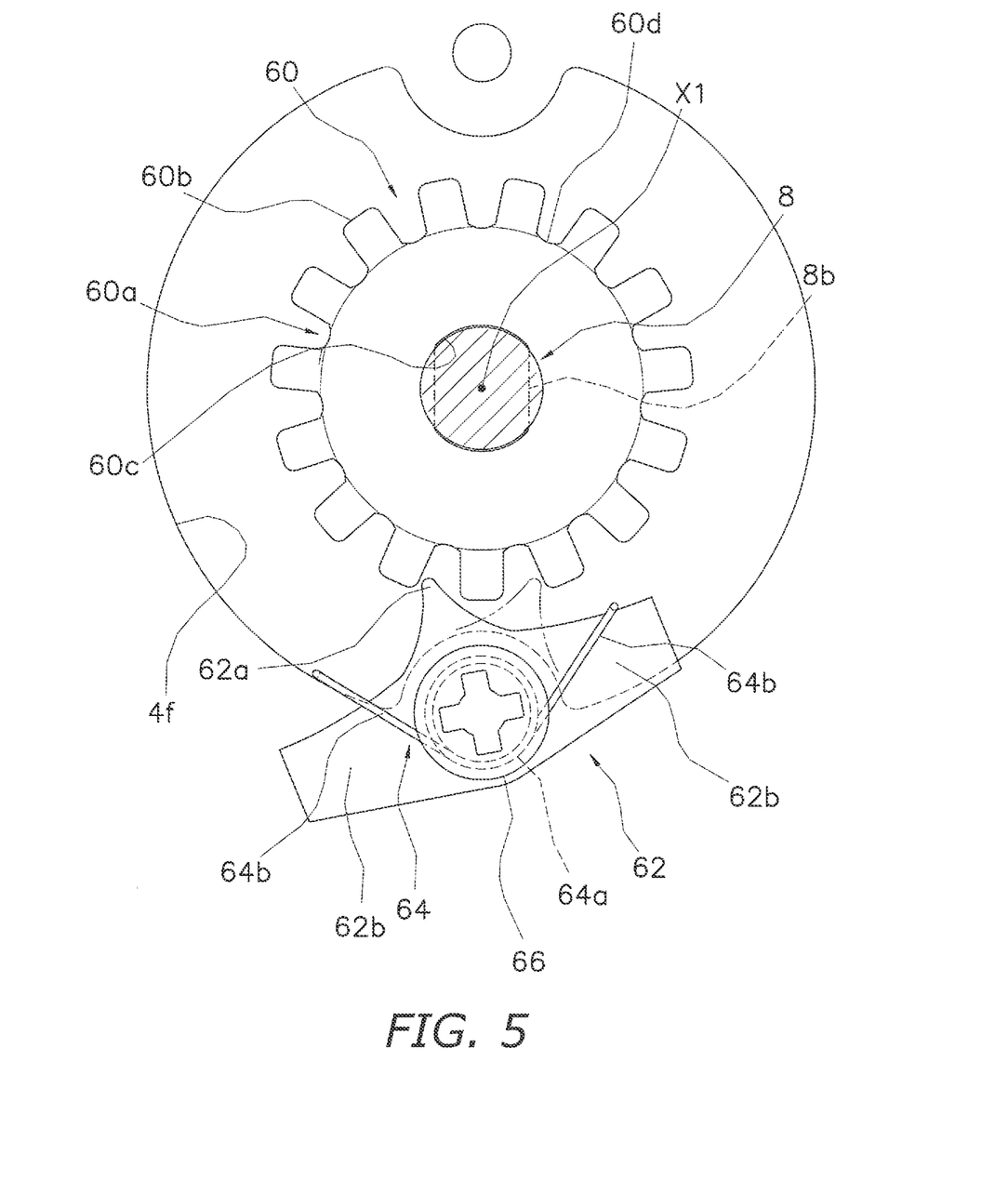
FIG. 5 is a front view of a spool sound producing mechanism.

As illustrated in FIGS. 3, 4 and 5, the spool sound producing mechanism 20 includes the ratchet wheel 60, a claw member 62 for producing a sound, and an urging member 64. The ratchet wheel 60 is non-rotatably mounted onto the spool shaft 8 (e.g., a first component). The claw member 62 is pivotally attached to the spool 4 (e.g., a second component). The claw member 62 is configured to repeatedly collide with the ratchet wheel 60. The urging member 64 urges the claw member 62. The ratchet wheel 60 has a mounting part 60a and teeth 60b. The mounting part 60a is mountable onto the rear ends of the anti-rotation portions 8b of the spool shaft 8. The teeth 60b are disposed on an outer peripheral portion 60d of the mounting part 60a.

The mounting part 60a has a non-circular hole 60c in the center thereof. The non-circular hole 60c is non-rotatably engaged with the anti-rotation portions 8b of the spool shaft 8. In the present exemplary embodiment, the non-circular hole 60c is formed in an elliptic slot shape. However, the non-circular hole 60c can be formed in any suitable shape (e.g., a rectangular shape) as long as it can be engaged with the parallel surfaces of the anti-rotation portions 8b.

The teeth 60b are radially disposed on the outer peripheral portion 60d of the mounting part 60a. The teeth 60b are bent from the outer peripheral portion 60d of the mounting part 60a, and extend along the axis X1 of the spool shaft 8 (an exemplary rotary axis of the first component and the second component). A claw portion 62a (to be described) of the claw member 62 is engaged between adjacent two of the teeth 60b. For example, the ratchet wheel 60 is formed by producing a part to be obtained as the non-circular hole 60c and a part to be obtained as the teeth 60c by punching of a metal plate and then bending the radially punched part to be obtained as the teeth 60b by pressing.

The claw member 62 is pivotally attached to the rear surface of the bobbin trunk 4a of the spool 4. The claw member 62 is supported by a pivot support shaft 66. The pivot support shaft 66 is made in the form of a bolt, and is screwed into the rear surface of the bobbin trunk 4a The claw member 62 has the claw portion 62a, a pair of spring hooked portions 62b and a support hole 62c. The claw portion 62a is disposed in the center of the claw member 62. The spring hooked portions 62b extend from the claw portion 62a to the both lateral sides. The support hole 62c is supported by the pivot support shaft 66 disposed in alignment with the claw portion 62a.

The urging member 64 urges the claw member 62 to a neutral position. In the neutral position, the claw portion 62a is disposed between adjacent two of the teeth 60b of the ratchet wheel 60. For example, the urging member 64 is made in the form of a coil spring made of a spring wire rod. The urging member 64 is mounted onto the pivot support shaft 66. The urging member 64 has a coil portion 64a and a pair of lock portions 64b. The coil portion 64a is mounted onto the pivot support shaft 66. The lock portions 64b extend from the coil portion 64a. The lock portions 64b are hooked on the spring hooked portions 62b, respectively. When the claw member 62 is pivoted, either of the lock portions 64b is configured to be compressed while being hooked on the inner peripheral surface 4f of the bobbin trunk 4a of the spool 4. Accordingly, the claw member 62 is urged towards the neutral position.

In the spinning reel, the number of the adjuster washers 57 is increased or reduced, for example, in order to form the wound shape of the fishing line about the bobbin trunk 4a in a desired shape. When such adjustment is performed, the axial position of the claw member 62 mounted to the spool 4 is displaced. However, the teeth 60b of the ratchet wheel 60 has a large axial length in the present exemplary embodiment, and hence, no malfunction is caused in the spool sound producing mechanism 20 even when the positional adjustment is performed for the spool 4 and thereby the axial position of the claw member 62 is displaced as described above.

Oscillating Mechanism

As illustrated in FIG. 2, the oscillating mechanism 6 is a mechanism configured to move back and forth the spool shaft 8 fixed to the center part of the spool 4 in order to move the spool 4 in the same direction as the spool shaft 8. The oscillating mechanism 6 includes a drive gear part 15, an intermediate gear part 16, a cam gear part 17, the slider part 18 and a guide part 19. The drive gear part 15 is mounted onto the drive gear shaft 11a, while being integrated therewith (or separated therefrom). The intermediate gear part 16 has a large-diameter gear portion 16a and a small-diameter gear portion 16b. The large-diameter portion 16a is meshed with the drive gear part 15. The small-diameter portion 16b is meshed with the cam gear part 17. The cam gear part 17 is meshed with the small-diameter portion 16b, and is rotated in conjunction with the drive gear part 15 while the rotation speed thereof is much reduced than that of the drive gear part 15. The slider part 18 is engaged with the cam gear part 17, while being non-rotatably and immovably fixed to the rear end of the spool shaft 8. The slider part 18 is configured to be moved back and forth, while being engaged with the cam gear part 17. The guide part 19 is attached to the reel body 2a, and guides the slider part 18 such that the slider part 18 can be moved back and forth. The guide part 19 is composed of two guide shafts 19a and 19b. The guide shafts 19a and 19b are disposed one above the other at a prescribed spacing.

For example, the drive gear part 15 is a circular gear (a spur gear, a helical gear, etc.) and the number of its gear teeth is 14. The drive gear part 15 is integrally mounted onto the drive gear shaft 11a, while being disposed away from the drive gear 11 at a prescribed distance. The intermediate gear part 16 is a disc-shaped member. The intermediate gear part 16 is mounted to the reel body 2a while being rotatable about an axis arranged in parallel to the drive gear shaft 11a. The small-diameter portion 16b and the cam gear part 17 are non-circular gears. The number of gear teeth of the cam gear part 17 is larger than that of the small-diameter portion 16b.

Operation and Action of Reel

In casting, the bail arm 9 is flipped over to the fishing-line releasing position, while the fishing line is hooked by the index finger of an angler. Then, the fishing rod is cast under the condition.

In winding the fishing line, the bail arm 9 is flipped over to the fishing-line winding position. When fish gets caught in a terminal tackle under the condition, the handle 1 is rotated in the fishing-line winding direction. When the handle 1 is rotated, the rotational force is transmitted to the pinion gear 12 through the drive shaft 10 and the drive gear 11. The rotational force, transmitted to the pinion gear 12, is transmitted to the rotor 3 through the front part of the pinion gear 12. Accordingly, the fishing line is wound about the spool 4. At this time, the spool 4 is reciprocated back and forth by the oscillating mechanism 6.

In trying to wind the fishing line about the spool 4 when a fish is hooked on the terminal tackle of the fishing line, the fishing line is reeled out of the spool 4 and the spool 4 is rotated in the fishing-line releasing direction if the fish pulls the fishing line with a force greater than a set drag force. When the spool 4 is rotated, the claw member 62 of the spool sound producing mechanism 20 is rotated together with the spool 4 and repeatedly collides with the ratchet wheel 60.

Accordingly, the spool sound producing mechanism 20 produces a sound. At this time, the teeth 60b are elastically deformed. Therefore, the teeth 60b are unlikely to be abraded. Further, a clear click sound is herein produced due to vibration of the teeth 60b.

Further, the spool sound producing mechanism 20 has a structure that the teeth 60b of the ratchet wheel 60 are formed so as to extend from the mounting part 60a along the axial direction of the spool shaft 8. Therefore, the length of the teeth 60b along the axial direction of the spool shaft 8 is larger than the thickness of the mounting part 60a. With the structure, troubles become unlikely to be caused without elongating the axial length of the claw member 62 even when the ratchet wheel 60 and the claw member 62 are displaced from each other.

Second Exemplary Embodiment

Entire Structure

Figure 6:
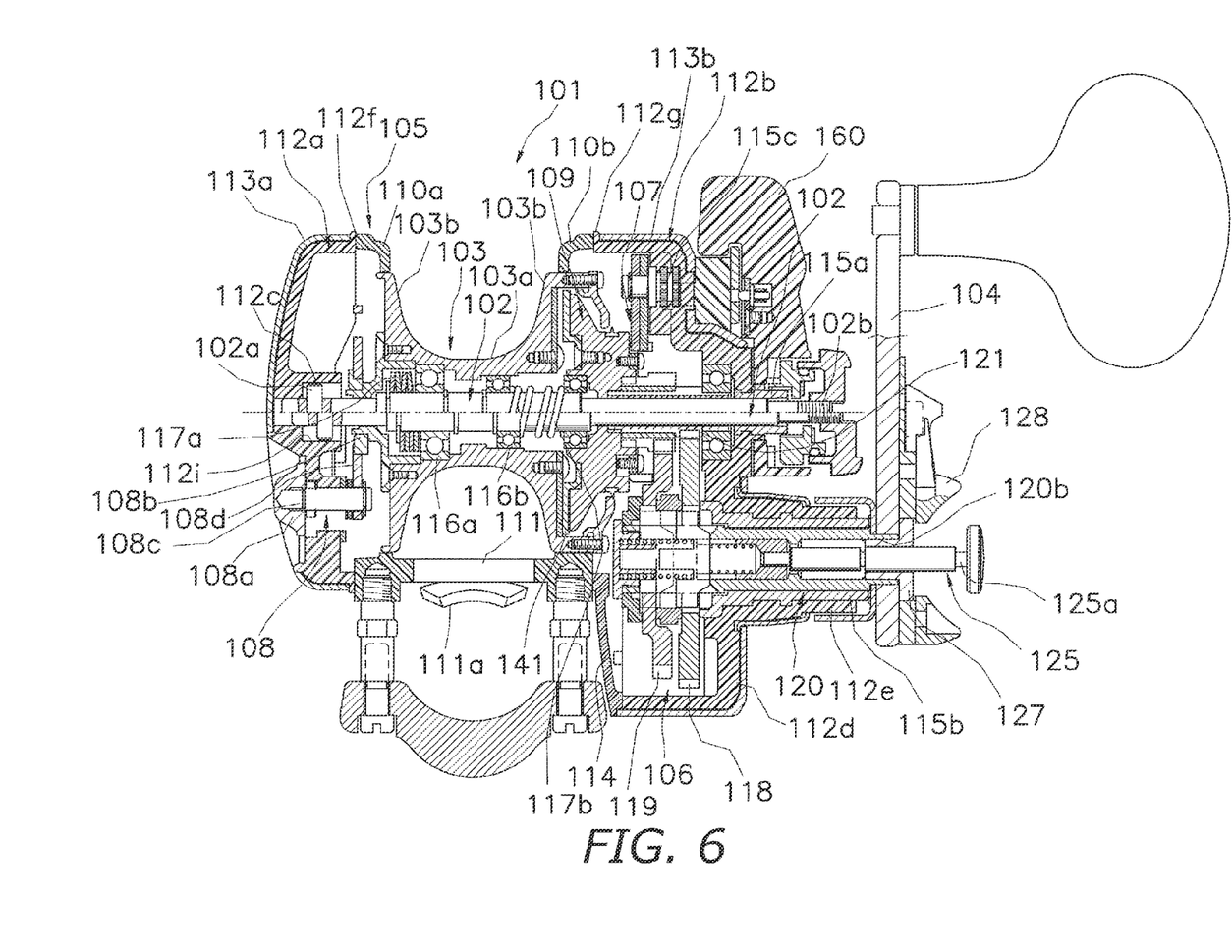
FIG. 6 is a cross-sectional view of a dual-bearing reel employing a ratchet wheel in accordance with a second exemplary embodiment.

As illustrated in FIG. 6, a dual-bearing reel employing a second exemplary embodiment of the present invention is a medium-sized lever drag reel. The lever drag reel includes a tubular reel unit 101, a spool shaft 102, a spool 103 and a handle 104. The spool shaft 102 is mounted to the center part of the reel unit 101, while being non-rotatable and axially movable. The spool 103 is supported by the spool shaft 102, while being rotatable and axially immovable. The handle 104 is disposed laterally to the reel unit 101. Further, the lever drag reel includes a rotation transmission mechanism 106, an anti-reverse mechanism 107, a lever drag mechanism 109 in the interior of the reel unit 101. The rotation transmission mechanism 106 is configured to transmit rotation of the handle 104 to the spool 103. The anti-reverse mechanism 107 is provided for enabling the lever drag mechanism 109 to be actuated. The anti-reverse mechanism 107 is configured to prevent a drag disc 142 to be described from rotating in the fishing-line releasing direction. The lever drag mechanism 109 is configured to brake rotation of the spool 103 in the fishing-line releasing direction.

Reel Unit

The reel unit 101 includes a frame 105 made of metal. The frame 105 includes a first side plate 110a, a second side plate 110b and a plurality of coupling portions 111. The first side plate 110a and the second side plate 110b are a right and left pair of saucer-shaped members made of metal. The coupling portions 111 couple the first side plate 110a and the second side plate 110b at the front, the rear and the bottom of the frame 105. A fishing rod attachment portion 111a is integrally formed with the bottom one of the coupling portions 111 of the frame 105. The fishing rod attachment portion 111a is a portion for attaching the lever drag reel to a fishing rod.

Further, the reel unit 101 includes a first cover member 112a, a second cover member 112b, a third cover member 113a, a fourth cover member 113b and a lid member 114. The first and second cover members 112a and 112b are made of, for example, high stiffness resin (e.g., glass fiber reinforced polyamide resin). The first cover member 112a covers the outside of the first side plate 110a, while the second cover member 112b covers the outside of the second side plate 110b. The third and fourth cover members 113a and 113b are ornamental members made of, for example, light metal (e.g., aluminum alloy). The third cover member 113a covers the first cover member 112a, while the fourth cover member 113b covers the second cover member 112b. The lid member 114 is made of high stiffness resin, and covers the inner side of the second cover member 112b. Each of the first and second side plates 110a and 110b has an opening for allowing the spool 103 to pass therethrough. The first cover member 112a has a boss portion 112c formed in the inside thereof. The left end of the spool shaft 102 is supported by the boss portion 112c, while being axially movable and non-rotatable. A spool sound producing mechanism 108 is disposed inside the first cover member 112a. The spool sound producing mechanism 108 is configured to produce a sound in conjunction with rotation of the spool 103.

The spool sound producing mechanism 108 is configured to be switchable between a sound producing state and a silent state in response to an operation of a click button 108a. The spool sound producing mechanism 108 includes a ratchet wheel 108b and a claw member 108d. The ratchet wheel 108b is configured to be unitarily rotated with the spool 103. The claw member 108d is pivotally supported by a shaft member 108c attached to the click button 108a. The claw member 108d is movable between a sound producing position and a silent position in response to an operation of the click button 108a along the radial direction. The claw member 108d is configured to be engaged with the ratchet wheel 108b in the sound producing position. On the other hand, the claw member 108d is configured to be separated away from the ratchet wheel 108b in the silent position.

Figure 7:
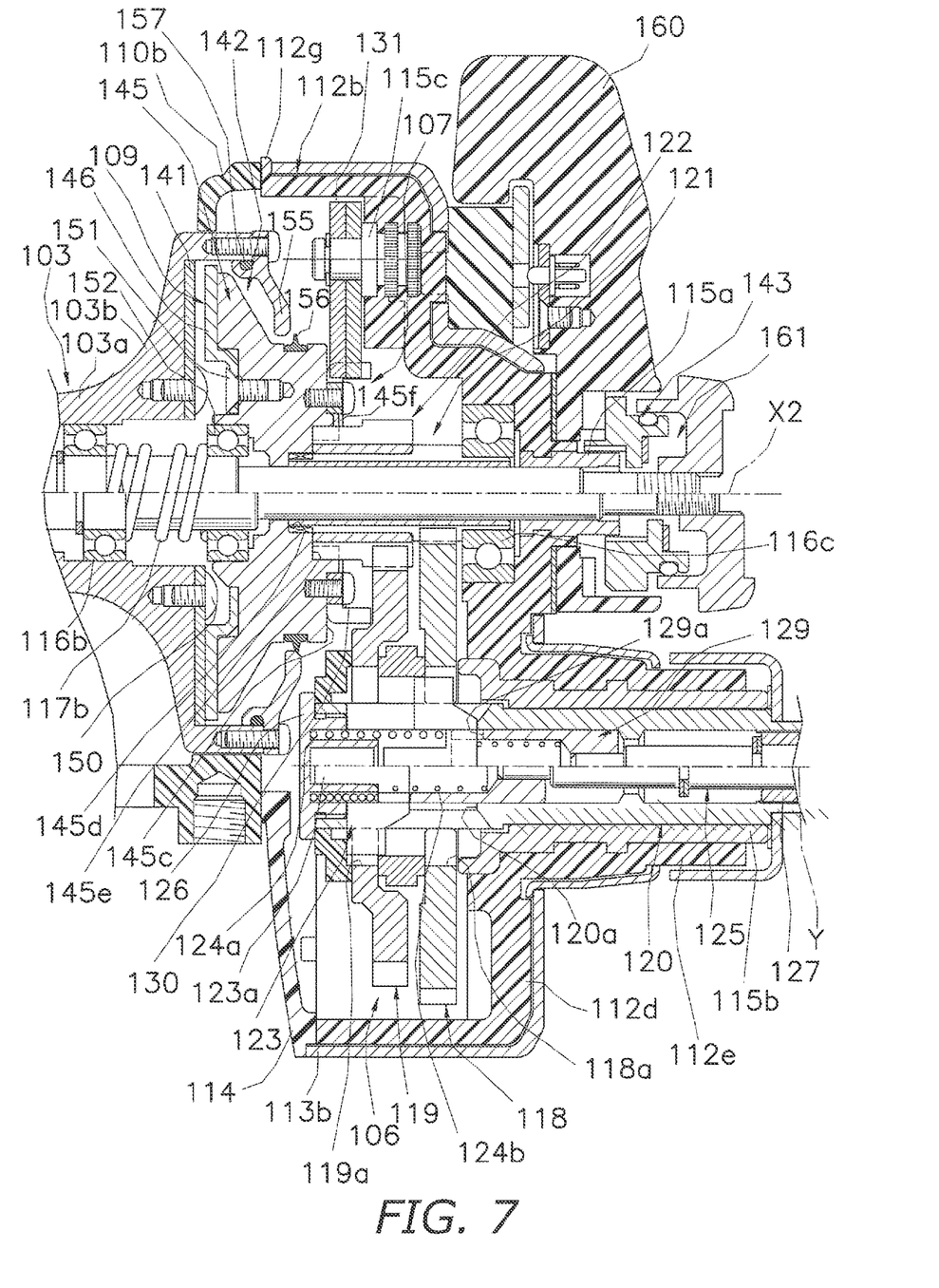
FIG. 7 is an enlarged cross-sectional view of the dual-bearing reel on the handle-side part thereof.
Figure 8:
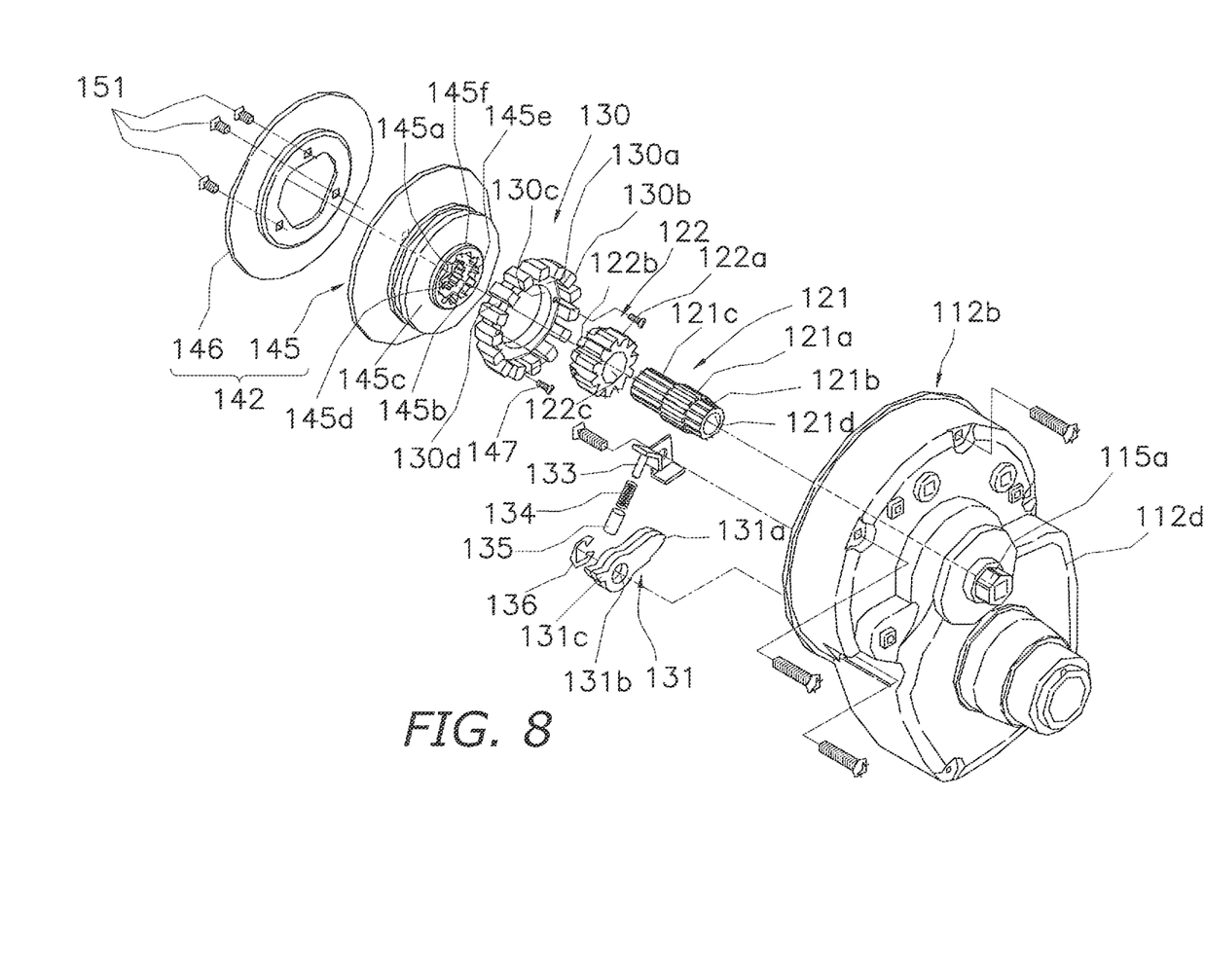
FIG. 8 is an exploded perspective view of an anti-reverse mechanism.

As illustrated in FIG. 7, a bulged portion 112d is formed on the second cover member 112b that is disposed on the side with the handle 104, while being protruded in both a radial direction and an axially outward direction. The bulged portion 112d is radially protruded, while being slanted slightly forwards. The rotation transmission mechanism 106 is disposed in the bulged portion 112d. Further, a first insert member 115a is insert-molded into the bulged portion 112d, while being protruded radially outwards. The first insert member 115a is a tubular member made of metal with good slidability (e.g., brass). The first insert member 115a supports the right end of the spool shaft 102 in an axially movable state. Further, a support tubular portion 112e is formed below the first insert member 115a, while being protruded axially outwards. The support tubular portion 112e supports a drive shaft 120 of the handle 104. Further, a second insert member 15b is insert-molded to the inside of the support tubular portion 112e. The second insert member 115b is a tubular member made of metal with good slidability (e.g., brass). The second insert member 115b supports the drive shaft 120 in a rotatable state. Further, a third inert member 115c is insert-molded into a portion of the rear part of the second cover member 112b, i.e., the portion on which the bulged portion 112d is not formed. The third insert member 115c is a shaft-like member made of metal with good slidability (e.g., brass). The third insert member 115c supports a claw member 131 (to be described) of the anti-reverse mechanism 107 in a pivotable state. It should be noted that FIG. 7 is illustrated as if the third insert member 115c were disposed in the upper part of the second cover member 112b. However, the third insert member 115c is actually disposed in the rear part of the second cover member 112b as illustrated in FIG. 8.

As illustrated in FIG. 6, the third cover member 113a is formed along the outer surface of the first cover member 112a so as to cover the first cover member 112a, while the fourth cover member 113b is formed along the outer surface of the second cover member 112b so as to cover the second cover member 112b. It should be noted that a protruded portion 112f is formed on the circumferential edge of the first cover member 112a such that the circumferential edge of the third cover member 113a is abutted thereto, while a protruded portion 112g is formed on the circumferential edge of the second cover member 112b such that the circumferential edge of the fourth cover member 113b is abutted thereto. The first and second cover members 112a and 112b, made of synthetic resin, are exposed to the outside only at the protruded portions 112f and 112g. When the third and fourth cover members 113a and 113b are fabricated by pressing of a thin plate made of aluminum alloy, for example, and the circumferential edges thereof are unevenly formed, such unevenly formed portions can be prevented from standing out by providing such protruded portions 112f and 112g.

Spool Shaft

As described above, the spool shaft 102 is supported by the boss portion 112c of the first cover member 112a and the first insert member 115a of the second cover member 112b, while being axially movable and non-rotatable. An anti-rotation pin 102a is attached to the left end portion of the spool shaft 102, while radially penetrating therethrough. On the other hand, an anti-rotation slit 112i is formed along the radial direction in the boss portion 112c of the first cover member 112a so as to be engaged with the anti-rotation pin 102a.

The spool 103 is rotatably supported by the spool shaft 102 through two bearings 116a and 116b disposed on the outer peripheral surface of the spool shaft 102. The bearing 116a is urged axially inwards (i.e., rightwards in FIG. 6) by a first spring member 117a made in the form of a disc spring, while the bearing 116b is urged axially inwards (i.e., leftwards in FIG. 6) by a second member 117b made in the form of a coil spring. Further, the axially inner lateral surfaces of the bearings 116a and 116b are restricted from inwardly moving by the spool 103 and the spool shaft 102. The structure enables the spool shaft 102 and the spool 103 to unitarily move in the axial direction. The spool shaft 102 is configured to be axially moved together with the spool 103 by the lever drag mechanism 109. The spool shaft 102 has a male threaded portion 102b on the right end thereof. A component, forming a part of a moving mechanism 143 (to be described) of the lever drag mechanism 109, is screwed onto the male threaded portion 102b. Further, a first pinion gear 121 (to be described), which is a small-diameter member of the rotation transmission mechanism 106, is mounted onto the outer periphery of the spool shaft 102.

Spool

As illustrated in FIG. 6, the spool 103 has a bobbin trunk 103a and a pair of flanges 103b. The flanges 103b are integrally formed on the both axial ends of the bobbin trunk 103a. A friction disc 141 forms a part of the lever drag mechanism 109. The friction disc 141 is fixed to the end surface of the right-side one of the flanges 103b by screw members to be described.

Handle

The handle 104 is fixed to the protruded end of the tubular drive shaft 120 disposed below and in parallel to the spool shaft 102. As described above, the drive shaft 120 is rotatably supported by the reel unit 101 through the second insert member 115b. As illustrated in FIG. 7, the drive shaft 120 has a slit 120a and a female threaded portion 120b (see FIG. 6). The slit 120a is formed on the base end of the drive shaft 120, while radially penetrating therethrough. The female threaded portion 120b is formed on the inner surface of the tip end of the drive shaft 120 in order to fix the handle 104.

Rotation Transmission Mechanism

The rotation transmission mechanism 106 includes a speed change mechanism configured to switch handle rotation between two speed levels, i.e., a high speed level and a low speed level. As illustrated in FIG. 7, the rotation transmission mechanism 106 includes a first drive gear 118, a second drive gear 119, the first pinion gear 121, a second pinion gear 122, an engaging piece 123, two compression springs 124a and 124b, and an operating shaft 125. The first drive gear 118 is used for winding the fishing line at a high speed, while the second drive gear 119 is used for winding the fishing line at a low speed. The first and second drive gears 118 and 119 are rotatably supported by the drive shaft 120 of the handle 104. The first pinion gear 121 and the second pinion gear 122 are rotatably mounted onto the spool shaft 102. Simultaneously, the first pinion gear 121 is meshed with the first drive gear 118, while the second pinion gear 122 is meshed with the second drive gear 119. The engaging piece 123 is configured to couple either the first drive gear 118 or the second drive gear 119 to the drive shaft 120. Accordingly, handle rotation is transmitted to the coupled one of the first and second drive gears 118 and 119 via the drive shaft 120. The compression springs 124a and 124b position the engaging piece 123 on the both sides of the engaging piece 123. The operating shaft 125 sets the position of the engaging piece 123.

Each of the first and second drive gears 118 and 119 has a circular support hole (not illustrated in the figures) formed in the center part thereof, and further has two perpendicular slits 118a, 119a to be engaged with the engaging piece 123. The second drive gear 119 is formed so as to be bent towards the first drive gear 118 in order to avoid interference with a ratchet wheel 130 of the anti-reverse mechanism 107.

The first pinion gear 121 is a tubular member made of anti-corrosive metal (e.g., non-magnetic stainless alloy). The right end of the first pinion gear 121 is rotatably supported by a bearing 116c. The bearing 116c is attached to the bulged portion 112d, while being disposed about the spool shaft 102. On the other hand, the left end of the first pinion gear 121 is engaged with the drag disc 142 of the lever drag mechanism 109, while being unitarily rotatable therewith. As illustrated in FIG. 8, the first pinion gear 121 has first gear teeth 121a, a first bearing support portion 121b and a first engaging and coupling portion 121c. The first gear teeth 121a are meshed with the first drive gear 118. The first bearing support portion 121b is supported by the bearing 116c. The first engaging and coupling portion 121c is disposed on the opposite side of the first bearing support portion 121b through the first gear teeth 121a. A first pass-through hole 121d is formed in the inner peripheral part of the first pinion gear 121. The spool shaft 102 can pass through the first pass-through hole 121d. A clearance of roughly 0.05 to 0.3 mm is produced between the first pass-through hole 121d and the spool shaft 102. Therefore, the first pinion gear 121 can be smoothly rotated relatively to the spool shaft 102.

The first pinion gear 121 is produced by cutting a blank that the first gear teeth 121a are formed over the entire length thereof. Specifically, the both axial sides of the part to be obtained as the first gear teeth 121a are cut such that steps in use for positioning are formed and convexo-concave portions in use for preventing rotation are left. Through the cutting process, the first bearing support portion 121b and the first engaging and coupling portion 121c are formed on the both axial sides of the first gear teeth 121a. Therefore, each of the first bearing support portion 121b and the first engaging and coupling portion 121c has a diameter smaller than that of the first gear teeth 121a, and is formed such that the first gear teeth 121a, originally formed on the blank, are partially left. The first pinion gear 121 is disposed while being interposed between the drag disc 142 and an inner race of the bearing 116c. The first pinion gear 121 is thus mounted in an axially immovable state.

The second pinion gear 122 is a tubular member made of the same material as the first pinion gear 121. As illustrated in FIG. 7, the left end of the second pinion gear 122 is engaged with the drag disc 142, while being unitarily rotatable therewith. As illustrated in FIG. 8, the second pinion gear 122 has second gear teeth 122a and a second engaging and coupling portion 122b. The second gear teeth 122a are meshed with the second drive gear 119. The second engaging and coupling portion 122b is disposed adjacently to the second gear teeth 122a. A second pass-through hole 122c is formed in the inner peripheral part of the second pinion gear 122. The first engaging and coupling portion 121c of the first pinion gear 121 can pass through the second pass-through hole 122c. A clearance of roughly 0.01 to 0.05 mm is produced between the second pass-though hole 122c and the first engaging and coupling portion 121c. Therefore, the second pinion gear 122 does not contact the first pinion gear 121, but is substantially supported by the first pinion gear 121.

The second pinion gear 122 is produced by cutting a blank that the second gear teeth 122a are formed over the entire length thereof. Specifically, one axial side of the part to be obtained as the second gear teeth 122a is cut such that a step in use for positioning is formed and convexo-concave portions in use for preventing rotation are left. Through the cutting process, the second engaging and coupling portion 122b is formed on one side of the second gear teeth 122a. Therefore, the second engaging and coupling portion 122b has a diameter smaller than that of the second gear teeth 122a and is formed such that the second gear teeth 122a, originally formed on the blank, are partially left. The second pinion gear 122 is disposed while being interposed between the drag disc 142 and the first pinion gear 121. The second pinion gear 122 is thus mounted in an axially immovable state.

The engaging piece 123 is non-rotatably disposed within the slit 120a of the drive shaft 120. The engaging piece 123 has a protruded portion 123a in the center part thereof. When the engaging piece 123 is disposed on the side with the second drive gear 119, the protruded portion 123a is configured to be disposed on the inner peripheral side of a flange-shaped spring receiver 126 for receiving the compression spring 124a. The spring receiver 126 is screwed into the base end of the drive shaft 120.

As illustrated in FIG. 6, the operating shaft 125 is disposed inside the drive shaft 120, while being protruded to the outside through the drive shaft 120. The operating shaft 125 is supported by a nut 127, while being axially movable. The nut 127 serves to fix the handle 104 to the drive shaft 120, while the handle 104 is screwed onto the protruded end of the drive shaft 120. The operating shaft 125 has an annular groove 125a formed on the outwardly protruded end thereof. A slide-type stopper 128 is mounted to the handle 104. The stopper 128 is engaged with the annular groove 125a. Further, a spring receiver member 129 is attached onto the opposite-side end of the operating shaft 125. The spring receiver member 129 receives the compression spring 124b. The tip end of the operating shaft 125 is fitted into the spring receiver member 129. The spring receiver member 129 has a slit 129a to be engaged with the engaging piece 123. The engaging piece 123 is pressed by the slit 129a.

In the rotation transmission mechanism 106 structured as described above, the engaging piece 123 is disposed in the second drive gear 119 when the operating shaft 125 is inwardly pressed as depicted on the lower side of an operating axis Y in FIG. 7. The rotation of the handle 104 is thereby transmitted to the second pinion gear 122 through the second drive gear 119. Accordingly, the spool 103 is rotated at a low speed. On the other hand, the engaging piece 123 is disposed in the first drive gear 118 when the operating shaft 125 is outwardly pulled as depicted on the upper side of the operating axis Y in FIG. 7 by sliding the slide-type stopper 128. The rotation of the handle 104 is thereby transmitted to the first pinion gear 121 through the first drive gear 118. Accordingly, the spool 103 is rotated at a high speed.

Structure of Anti-Reverse Mechanism

Figure 9:
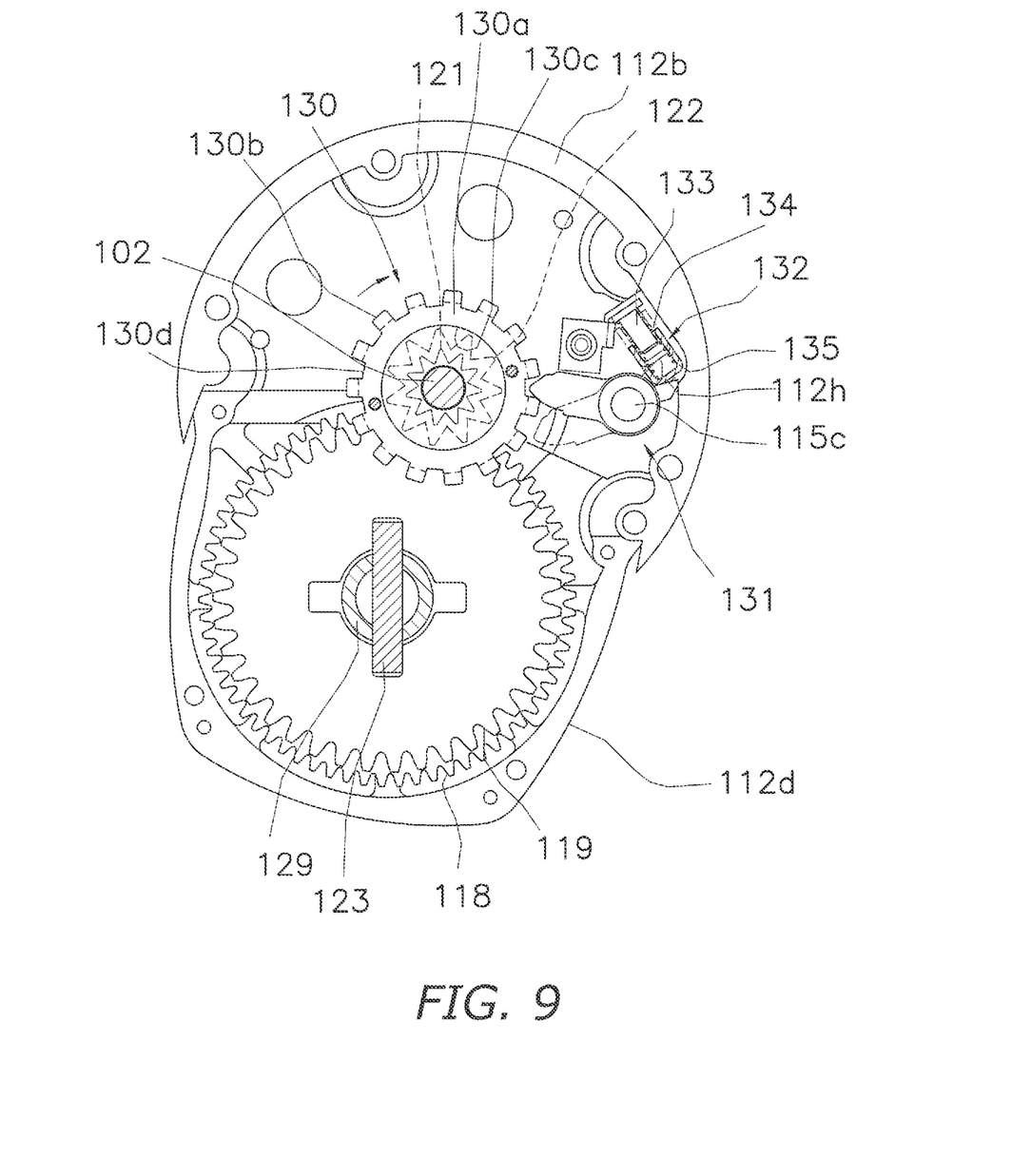
FIG. 9 is a partial cross-sectional view of the anti-reverse mechanism seen from the inside thereof.

As illustrated in FIGS. 8 and 9, the anti-reverse mechanism 107 is a claw-type one-way clutch, and includes the ratchet wheel 130, the claw member 131 and an urging member 132. The ratchet wheel 130 has a mounting part 130a and a plurality of teeth 130b. The mounting part 130a is mounted to the drag disc 142, while being unitarily rotatable therewith. The teeth 130b are disposed on the outer peripheral portion of the mounting part 130a. The claw member 131 is engaged with the teeth 130b. The urging member 132 urges the claw member 131 towards the teeth 130b.

The ratchet wheel 130 is disposed on the outer peripheral side of the second pinion gear 122. As illustrated in FIG. 8, the ratchet wheel 130 is formed by bending a metal plate. The mounting part 130a is fixed to a lateral surface 145c (i.e., a surface away from the spool 103) of a disc body 145 (to be described) forming a part of the drag disc 142 by bolt members 147. The mounting part 130a has an axis-aligned hole 130c. The axis-aligned hole 130c is fitted onto an axis-aligning protrusion 145f. The axis-aligning protrusion 145f is circularly formed on the lateral surface 145c, while being protruded coaxially with the axis-aligned hole 130c. The teeth 130b are radially disposed on an outer peripheral portion 130d of the mounting part 130a. The teeth 130b are bent from the outer peripheral portion 130d of the mounting part 130a, and extend along an axis X2 of the spool shaft 102 (an exemplary rotary axis of the first component and the second component).

The claw member 131 is a member formed by punching a thin plate made of, for example, stainless alloy by pressing. In the present exemplary embodiment, the claw member 131 is composed of two members with the same thickness. The claw member 131 is coupled to the reel unit 101, while being configured to pivot between an engaged position and a separated position. In the engaged position, the claw member 131 is engaged with the teeth 130b, and thereby, the reverse rotation of the drag disc 142 is prevented. In the separated position, the claw member 131 is separated away from the teeth 130b. The claw member 131 has a claw portion 131a, a mounting portion 131b and an engaging protruded portion 131c. The claw portion 131a is formed on the tip end of the claw member 131 so as to be capable of being engaged with the teeth 130b. The mounting portion 131b is made in the form of a hole, and is pivotally mounted onto the third insert member 115c. The engaging protruded portion 131c extends radially from the mounting portion 131b to the opposite side of the claw portion 131a. When the claw member 131 is set in the engaged position illustrated in FIG. 9, the engaging protruded portion 131c serves to keep the claw member 131 in the engaged position while making contact with the inner side of the second cover member 112b. The claw member 131 is retained with respect to the third insert member 115c by a retainer member 136 (e.g., an E-type snap ring).

The urging member 132 includes a coil spring 134 and a pressing member 135. The coil spring 134 is disposed on the outer peripheral side of a guide shaft 133 fixed to the second cover member 112b. The pressing member 135 is a closed-end tubular member for pressing the engaging protruded portion 131c. The pressing member 135 is disposed so as to cover the coil spring 134. The pressing member 135 presses the engaging protruded portion 131c towards a protruded portion 112h formed on the second cover member 112b. Accordingly, the claw member 131 is constantly urged towards the engaged position, and is configured to pivot towards the separated position only when the drag disc 142 is rotated together with the spool 103 in the fishing-line winding direction depicted with an arrow in FIG. 9.

In the anti-reverse mechanism 107 structured as described above, the ratchet wheel 130 is disposed between the second pinion gear 122 and the drag disc 142, and the claw member 131 is configured to be engaged with the ratchet wheel 130. Therefore, load in drag activation can be received by both of the ratchet wheel 130 and the claw member 13. Accordingly, load does not act on the second pinion gear 122 in drag activation. The second gear teeth 122a of the second pinion gear 122 can be thereby prevented from being damaged or broken.

Structure of Lever Drag Mechanism

As illustrated in FIG. 6, the lever drag mechanism 109 includes the friction disc 141, the drag disc 142 and the moving mechanism 143. The friction disc 141 is attached to the right end of the spool 103 in FIG. 6. The drag disc 142 is disposed in opposition to the friction disc 141. The moving mechanism 143 is configured to axially reciprocate the spool shaft 102.

The friction disc 141 is a washer-shaped disc member made of, for example, abrasion-resistant material (e.g., carbon graphite, fiber reinforced resin, etc.). The friction disc 141 is fixed to the outer lateral surface of the right-side flange 103b of the spool 103 by a plurality of attachment bolts 150 circumferentially disposed at intervals.

As illustrated in FIGS. 7 and 8, the drag disc 142 includes the disc body 145 and a brake disc 146. The drag disc 142 is an example of the first component and a rotary member. The disc body 145 is coupled to the first pinion gear 121, the second pinion gear 122 and the ratchet wheel 130, while being unitarily rotatable therewith. The drag disc 146 is a member made of, for example, stainless steel. The drag disc 146 is fixed to the disc body 145 by a plurality of attachment bolts 151, while being disposed in opposition to the friction disc 141. The drag disc 142 is prevented from rotating in the fishing-line releasing direction by the anti-reverse mechanism 107.

The disc body 145 is a disc-shaped member made of, for example, die-cast aluminum with a high heat dissipation performance. The disc body 145 is rotatably supported by the spool shaft 102 through a bearing 152. The drag disc 146 is fixed to a disc body 145 surface opposed to the spool 103. The drag disc 146 and the disc body 145 surface to which the drag disc 146 is attached are formed such that the center parts thereof are recessed for avoiding interference with the attachment bolts 150 of the friction disc 141.

The lateral surface 145c of the disc body 145, i.e., the surface disposed away from the spool 103, has a first engaged and coupled portion 145a and a second engaged and coupled portion 145b. The first engaged and coupled portion 145a is formed for allowing the first pinion gear 121 to be engaged therewith in a unitarily rotatable state, while the second engaged and coupled portion 145b is formed for allowing the second pinion gear 122 to be engaged therewith in a unitarily rotatable state.

As illustrated in FIG. 8, the first engaged and coupled portion 145a is recessed in the inner peripheral part of the disc body 145 that the spool shaft 102 passes therethrough. The first engaging and coupling portion 121c of the first pinion gear 121 is engaged with the first engaged and coupled portion 145a. The first engaged and coupled portion 145a is made in the form of a convexo-concave portion with a diameter slightly smaller than that of the first gear teeth 121a. The end surface of the first engaging and coupling portion 121c of the first pinion gear 121 is abutted to a first bottom surface 145d of the first engaged and coupled portion 145a.

The second engaged and coupled portion 145b is recessed on the radially outward of the first engaged and coupled portion 145a. The second engaging and coupling portion 122b of the second pinion gear 122 is engaged with the second engaged and coupled portion 145b. The second engaged and coupled portion 145b is made in the form of a convexo-concave portion with a diameter slightly smaller than that of the second gear teeth 122a. The end surface of the second engaging and coupling portion 122b of the second pinion gear 122 is abutted to a second bottom surface 145e of the second engaged and coupled portion 145b.

The first pinion gear 121 is herein positioned while being interposed and held between the inner race of the bearing 116c and the first bottom surface 145d of the first engaged and coupled portion 145a. On the other hand, the second pinion gear 122 is positioned while being interposed and held between the second bottom surface 145e of the second engaged and coupled portion 145b and a step produced between the first gear teeth 121a and the first engaging and coupling portion 121c of the first pinion gear 121.

As illustrated in FIG. 7, the outer side of the drag disc 142 is covered with a drag cover 155. The drag cover 155 is made of, for example, die-cast aluminum in consideration of heat dissipation performance. The drag cover 155 is fixed to the end surface of the right-side flange 103b of the spool 103 by bolt members. A seal member 156 is attached between the drag disc 142 and the inner peripheral side of the drag cover 155, while a seal member 157 is attached between the drag cover 155 and the spool 103.

As illustrated in FIG. 7, the moving mechanism 143 includes a drag lever 160, a pull mechanism 161 and a second spring member 117b. The drag lever 160 is pivotally mounted to the reel unit 101. The pull mechanism 161 is configured to pull and move the spool shaft 102 rightwards (in FIG. 7) in conjunction with one-directional pivot of the drag lever 160. The second spring member 117b is configured to move the spool shaft 102 leftwards (in FIG. 7) in conjunction with the other-directional pivot of the drag lever 160 by urging the spool shaft 102 leftwards (in FIG. 7).

Actions of Lever Drag Reel

In the lever drag reel structured as described above, the drag lever 160 is pivoted in regulating the magnitude of the drag force of the lever drag mechanism 109. When the drag lever 160 is set in a drag release position (i.e., the nearest-side pivot position), the friction disc 141 is separated away from the drag disc 142 in the lever drag mechanism 109. A drag release state is thereby produced, and the spool 103 becomes freely rotatable. Casting can be performed under the condition. When the drag lever 160 is pivoted and operated therefrom towards the away side, the friction disc 141 is gradually moved outwards in the spool shaft direction (i.e., rightwards in FIG. 6). Accordingly, the spool shaft 102 and the spool 103 are gradually moved rightwards. Consequently, the press-contact force of the friction disc 141 onto the drag disc 142 is increased, and thus, the drag force is increased.

When a force greater than a set drag force acts on the fishing line while in fishing, the spool 103 is rotated in the fishing-line releasing direction. At this time, the friction disc 141 is rotated relatively to the drag disc 142, and accordingly, the drag disc 142 tries to rotate in the fishing-line releasing direction. In response, the anti-reverse mechanism 107 is activated and the claw member 131 is engaged with the ratchet wheel 130. The drag disc 142 is thereby prevented from reversely rotating. At this time, the claw member 131 is engaged with the ratchet wheel 130 not with the second pinion gear 122. Therefore, the second pinion gear 122 can be prevented from being damaged or broken. In addition, reverse rotation is prevented at the ratchet wheel 130 in drag activation. Therefore, power is not transmitted from either the first pinion gear 121 or the second pinion gear 122 to either the first drive gear 118 or the second drive gear 119. Due to the above, the first pinion gear 121 and the second pinion gear 122 are not damaged or broken during drag activation.

Features

The aforementioned exemplary embodiments can be expressed as follows.

(A) The ratchet wheel 60 (or 130) for a fishing reel is mounted to the spool shaft 8 (or the drag disc 142) as the first component for the fishing reel. The ratchet wheel 60 (or 130) is engaged with the claw portion 62a (or 131a) of the claw member 62 (or 131) pivotally mounted to the spool 4 (or the reel unit 101) as the second component configured to be rotatable relatively to the first component. The ratchet wheel 60 (or 130) for the fishing reel includes the mounting part 60a (or 130a) and the teeth 60b (or 130b). The mounting part 60a (or 130a) is mountable to the first component. The teeth 60b (or 130b) are radially disposed on the outer peripheral portion 60d (130d) of the mounting part 60a (or 130a). The teeth 60b (or 130b) are bent from the outer peripheral portion 60d (130d) and extend along the axis X1 of the spool shaft 8 (or the axis X2 of the spool shaft 102) as the rotary axis of the first (or the second) component. The teeth 60b (or 130b) allow the claw portion 62a (or 131a) of the claw member 62 (or 131) to be engaged with any adjacent two thereof.

In the ratchet wheel 60 (or 130) for the fishing reel, the claw portion 62a (or 131a) of the claw member 62 (or 131) is engaged with any adjacent two of the teeth 60b (or 130b). The teeth 60b (or 130b) extend along the axis X1 (or X2). Therefore, even when the ratchet wheel 60 (or 130) and the claw member 62 (or 131) are displaced from each other in the rotary axial direction, the claw portion 62a (or 131a) of the claw member 62 (or 131) is allowed to be engaged with the teeth 60b (or 130b). Here, the teeth 60b (or 130b) of the ratchet wheel 60 (or 130) are formed so as to extend from the mounting part 60a (or 130a) along the direction of the axis X1 (or X2). Therefore, the length of the teeth 60b (or 130b) along the axial direction becomes larger than the thickness of the mounting part 60a (or 130a). Accordingly, troubles become unlikely to be caused without elongating the axial length of the claw member 62 (or 131) even when the ratchet wheel 60 (or 130) and the claw member 62 (or 131) are displaced from each other.

(B) The mounting part 60a (or 130a) and the teeth 60b (or 130b) can be integrally formed by a plate-shaped member and the teeth 60b (or 130b) can be bent by pressing. In this case, the ratchet wheel 60 (or 130) can be easily formed, for example, by producing a circular part to be obtained as the mounting part 60a (or 130a) and radial portions to be obtained as the teeth 60b (or 130b) disposed on the outer (or inner) peripheral portion of the circular part to be obtained as the mounting part 60a (or 130a) by punching, and then, by bending the radial portions to be obtained as the teeth 60b (or 130b) by pressing.

(C) The teeth 60b (or 130b) can be bent from the outer peripheral portion 60d (or 130d) of the mounting part 60a (or 130a). In this case, the teeth 60b (or 130b) are formed on the outer peripheral portion 60d (or 130d) of the mounting part 60a (or 130a). Therefore, the portions to be obtained as the teeth 60b (or 130b) extend such that the gaps therebetween gradually extend radially outward. Therefore, no limitation is imposed on the length of the teeth 60b (or 130b) along the axial direction. Thus, the mounting part 60a (or 130a) and the teeth 60b (or 130b) can be easily formed by punching.

(D) The teeth can be bent from the inner peripheral portion of the mounting part 60a (or 130a). In this case, a limitation is imposed on the length of the teeth along the axial direction when the portions to be obtained as the teeth are formed by punching. However, the ratchet wheel 60 (or 130) can be formed with a large diameter.

(E) The first component can be the spool shaft 8 for a spinning reel as a fishing reel, while the second component can be the spool 4 rotatably mounted onto the spool shaft 8. The mounting part 60a can be non-rotatably mounted onto the spool shaft 8, and is used for the spool sound producing mechanism 20 configured to produce a sound in conjunction with rotation of the spool 4. In this case, troubles become unlikely to be caused in the spool sound producing mechanism 20 of the spinning reel, even when back-and-front adjustment is performed for the spool 4.

(F) The first component can be the drag disc 142 configured to be rotated in conjunction with rotation of the handle 104 of a dual-bearing reel as a fishing reel, while the second component can be the reel unit 101 of the dual-bearing reel. The mounting part 130a can be mounted to the drag disc 142 in a unitarily rotatable state, and can be used for the anti-reverse mechanism 107 configured to prevent the drag disc 142 from rotating in one direction. In this case, troubles become unlikely to be caused in the anti-reverse mechanism 107 of the dual-bearing reel, even when the thickness of the claw member 131 is increased in accordance with drag force.

Other Exemplary Embodiments

Exemplary embodiments of the present invention have been explained above. However, the present invention is not limited to the aforementioned exemplary embodiments, and a variety of changes can be made without departing from the scope of the present invention. Especially, a plurality of exemplary embodiments and modifications described in the present specification can be arbitrarily combined on an as-needed basis.

(a) In the aforementioned exemplary embodiments, the teeth 60b (or 130b) are radially disposed on the outer peripheral portion 60d (or 130d) of the mounting part 60a (or 130a) in the ratchet wheel 60 (or 130). However, in the present invention, the structure of the teeth 60b (or 130b) is not limited to the above. Teeth can be radially disposed on the inner peripheral portion of the mounting part 60a (or 130a).

(b) In the aforementioned exemplary embodiments, the ratchet wheel 60 (or 130) is formed by pressing of a metal plate. However, in the present invention, the method of forming the ratchet wheel 60 (or 130) is not limited to the above. For example, the ratchet wheel 60 (or 130) can be formed by forming such as sintering or die casting.

(c) In the first exemplary embodiment, the present invention has been applied to the ratchet wheel 60 of the spool sound producing mechanism 20 for a spinning reel of a front-drag type. However, the application target of the present invention is not limited to the above. For example, the present invention can be applied to ratchet wheels of spool sound producing mechanisms for spinning reels of all types (a lever brake type, a rear drag type, a closed face type, etc.).

(d) In the second exemplary embodiment, the present invention has been applied to the ratchet wheel 130 of the anti-reverse mechanism 107 in the dual-bearing reel. However, the application target of the present invention is not limited to the above. For example, the present invention can be applied to the ratchet wheel 108b of the spool sound producing mechanism 108 of the dual-bearing reel.

What is claimed is:

1. A ratchet wheel for a fishing reel, the ratchet wheel being mounted to a first component of the fishing reel, the ratchet wheel being engaged with a claw portion of a claw member, the claw portion being pivotally mounted to a second component of the fishing reel, the second component being configured to be rotatable relatively to the first component, the ratchet wheel comprising:
    a mounting part configured to be mounted to the first component; and
    a plurality of teeth radially disposed on one of an outer peripheral portion of the mounting part and an inner peripheral portion of the mounting part, the teeth extending from the one of the outer peripheral portion and the inner peripheral portion along a rotary axis of either the first component or the second component in an axial direction so as to be offset from an axially facing surface of the mounting part, the teeth being configured such that two adjacent ones of the teeth selectively engage the claw portion of the claw member.

2. The ratchet wheel according to claim 1, wherein
    the mounting part and the teeth are integrally formed as a one-piece member in which the mounting part is a plate-shaped member and the teeth are bent parts of the mounting part.

3. The ratchet wheel according to claim 2, wherein
    the teeth extend from the outer peripheral portion of the mounting part.

4. The ratchet wheel according to claim 1, wherein
    the teeth extend from the outer peripheral portion of the mounting part.

5. A spinning reel including the ratchet wheel according to claim 1, the spinning reel comprising:
    a spool shaft as the first component; and
    a spool as the second component, the spool being rotatably mounted onto the spool shaft,
    the mounting part being non-rotatably mounted onto the spool shaft and arranged to form a spool sound producing mechanism that is configured to produce a sound in conjunction with rotation of the spool.

6. The spinning reel according to claim 5, wherein
    the mounting part and the teeth are integrally formed as a one-piece member in which the mounting part is a plate-shaped member and the teeth are bent parts of the mounting part.

7. The spinning reel according to claim 6, wherein
    the teeth extend from the outer peripheral portion of the mounting part.

8. The spinning reel according to claim 5, wherein
    the teeth extend from the outer peripheral portion of the mounting part.

9. A dual-bearing reel including the ratchet wheel according to claim 1, the dual-bearing reel comprising:
    a handle;
    a rotary member as the first component, the rotary member being operatively connected to the handle so that the rotary member rotates in conjunction with rotation of the handle; and
    a reel unit as the second component, and
    the mounting part being mounted to the rotary member in a unitarily rotatable state and arranged to form an anti-reverse mechanism that prevents the rotary member from rotating in one rotational direction.

10. The dual-bearing reel according to claim 9, wherein
    the mounting part and the teeth are integrally formed as a one-piece member in which the mounting part is a plate-shaped member and the teeth are bent parts of the mounting part.

11. The dual-bearing reel according to claim 10, wherein
    the teeth extend from the outer peripheral portion of the mounting part.

12. The dual-bearing reel according to claim 9, wherein
    the teeth extend from the outer peripheral portion of the mounting part.

13. A ratchet wheel for a fishing reel, the ratchet wheel being mounted to a first component of the fishing reel, the ratchet wheel being engaged with a claw portion of a claw member, the claw portion being pivotally mounted to a second component of the fishing reel, the second component being configured to be rotatable relatively to the first component, the ratchet wheel comprising:
- a mounting part configured to be mounted to the first component; and
- a plurality of teeth radially disposed on an inner peripheral portion of the mounting part, the teeth extending from the inner peripheral portion of the mounting part along a rotary axis of either the first component or the second component, the teeth being configured such that two adjacent ones of the teeth selectively engage the claw portion of the claw member.

* * * * *